F. W. TREFRY.
SWITCH FOR ALTERNATING CURRENT MACHINES.
APPLICATION FILED NOV. 25, 1911.

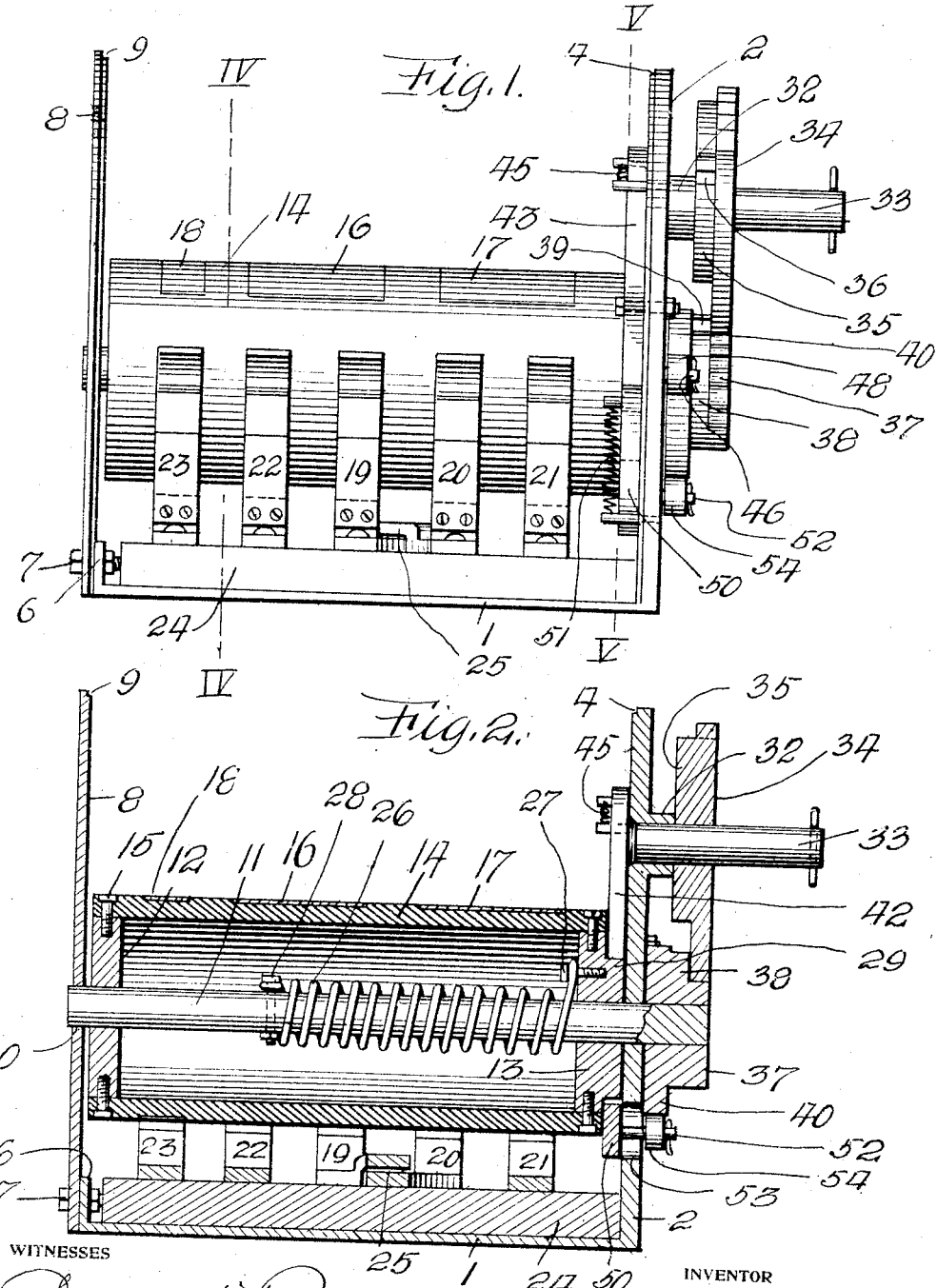

1,038,990.

Patented Sept. 17, 1912.

3 SHEETS—SHEET 2.

WITNESSES

INVENTOR
F. W. Trefry.
BY
ATTORNEYS

F. W. TREFRY.
SWITCH FOR ALTERNATING CURRENT MACHINES.
APPLICATION FILED NOV. 25, 1911.
1,038,990.
Patented Sept. 17, 1912.
3 SHEETS—SHEET 3.
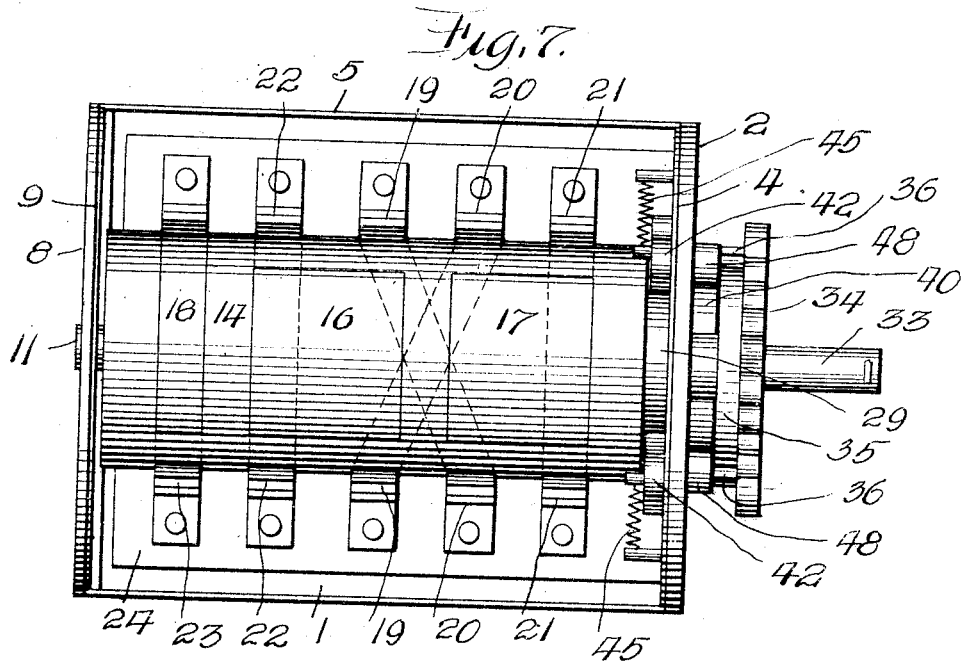
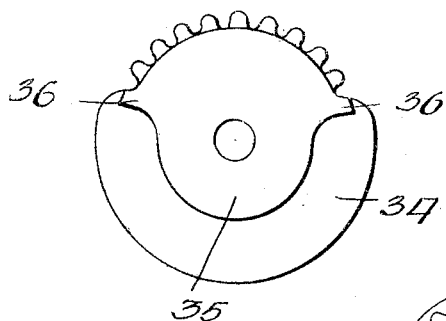
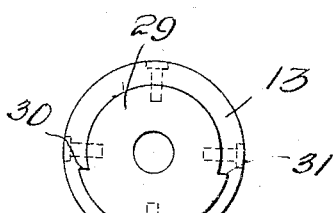
WITNESSES
Samuel Payne
Ralph C. Evert
INVENTOR
F. W. Trefry.
BY
ATTORNEYS

UNITED STATES PATENT OFFICE.

FREDRICK WILLIAM TREFRY, OF PITTSBURGH, PENNSYLVANIA.

SWITCH FOR ALTERNATING-CURRENT MACHINES.

1,038,990.

Specification of Letters Patent. Patented Sept. 17, 1912.

Application filed November 25, 1911. Serial No. 662,322.

*To all whom it may concern:*

Be it known that I, FREDRICK WILLIAM TREFRY, a citizen of the United States of America, residing at Pittsburgh, in the county of Allegheny and State of Pennsylvania, have invented certain new and useful Improvements in Switches for Alternating-Current Machines, of which the following is a specification, reference being had therein to the accompanying drawing.

This invention relates to a switch for an alternating current machine, especially that type used in elevator service, and my invention aims to provide:—First, a switch embodying positive and reliable means, in a manner as will be hereinafter set forth, whereby a positive throw of the switch will be obtained, thereby preventing the burning out of motors. Second, a switch that can be used in connection with alternating current machines of the two phase three wire, three phase, or two phase four wire type. Third, a positive-throw mechanism that can be used in connection with various types of rotary switches and contacts for obtaining a quick make and break of a current. Fourth, a switch consisting of comparatively few parts, inexpensive to manufacture, easy to assemble, durable and highly efficient for the purposes for which it is intended.

With the above and other objects in view, the invention resides in the novel construction, combination and arrangement of parts to be hereinafter specifically described and then claimed.

Reference will now be had to the drawings, wherein like numerals denote corresponding parts throughout the several views, in which:—

Figure 3:
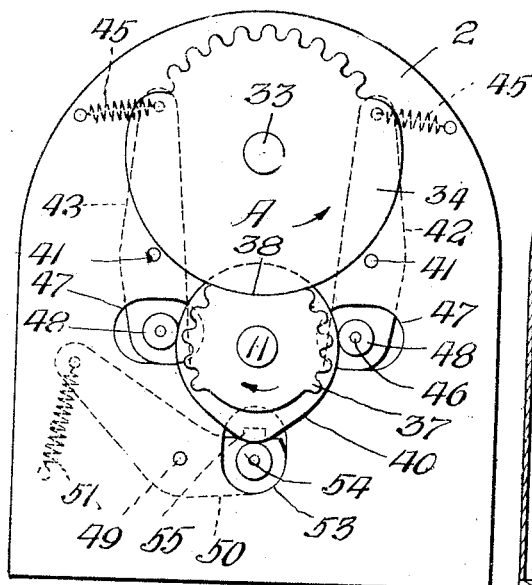
Figure 4:
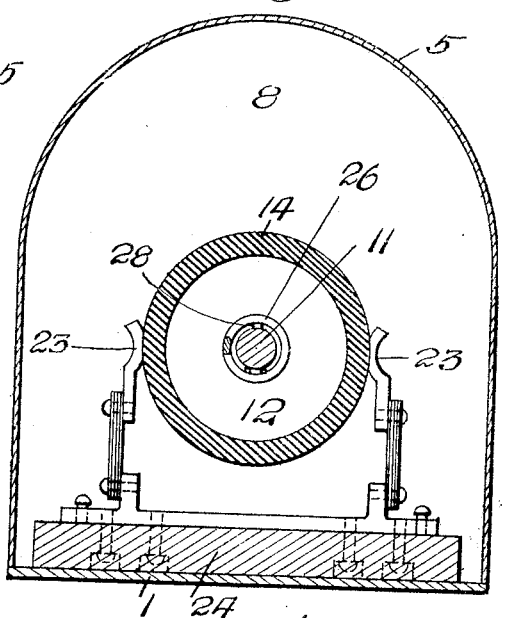
Figure 5:
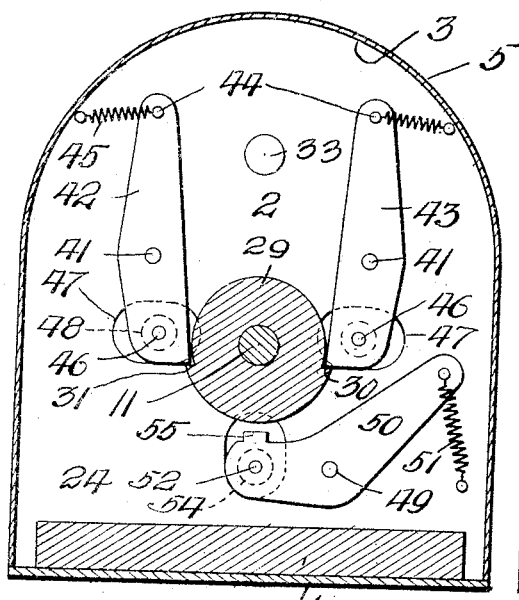
Figure 6:
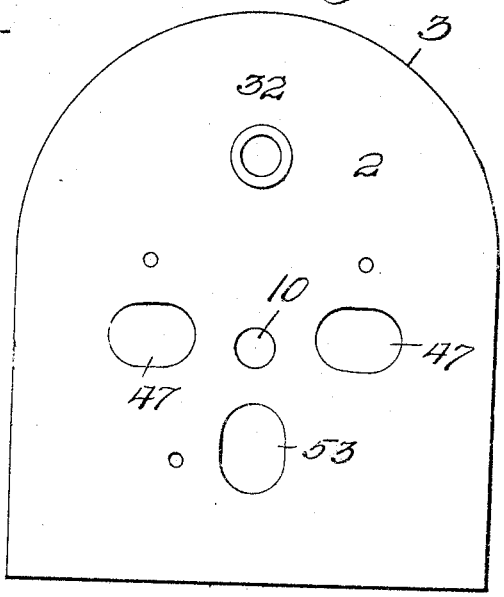

Figure 1 is a side elevation of a switch in accordance with this invention, showing the hood or cover thereof removed, Fig. 2 is a longitudinal sectional view of the switch, Fig. 3 is an end view of the switch, Fig. 4 is a cross sectional view of the same taken on the line IV—IV of Fig. 1, Fig. 5 is a similar view taken on the line V—V of Fig. 1, Fig. 6 is a view of the end plate of the switch with the mechanism thereof removed, Fig. 7 is a plan of the switch with the hood or cover thereof removed, Fig. 8 is an elevation of a detached sector gear, Fig. 9 is an elevation of a detached drum head, and Fig. 10 is an elevation of a detached cam.

A switch in accordance with this invention comprises a base plate 1 rectangular in plan and having one end thereof provided with an integral wall 2 that has the upper edge thereof rounded, as at 3 and the inner side of said wall cut away or provided with a shoulder 4 to accommodate one end of a detachable cover or hood 5. The opposite end of the base plate 1 has a transverse vertical flange 6 and bolted or otherwise connected to said flange, as at 7 is an end wall 8 corresponding in shape to the wall 2, said wall having a shoulder 9 to accommodate the opposite end of the cover or hood 5.

The end walls 2 and 8 are provided with longitudinally alining openings 10 for the ends of a rotor or shaft 11, one end of said rotor protruding from the end wall 2. Loosely mounted upon the rotor 11, between the end walls 2 and 8, are the heads 12 and 13 of a non-conductive drum or cylinder 14, preferably made of fiber. The drum is secured to the heads by circumferentially arranged screws 15 or other fastening means. Embedded in the periphery of the drum 14 are contact pieces 16, 17 and 18 adapted to be engaged by sets of contact fingers 19, 20, 21, 22 and 23 carried by a block 24 arranged upon the base plate 1. The sets of contact fingers 12 to 23 inclusive are made of a resilient conductive material and the sets 19 and 20 are connected upon the block 24 by cross bars 25. The contact fingers are connected to wires leading to and from the motor, to wire for cutting the phase and reversing and to the operating lines.

Encircling the rotor 11 within the drum 14 is a coiled spring 26 having one end thereof suitably connected, as at 27 to the inner side of the drum head 13. The opposite end of the spring is connected to a bolt or pin 28 mounted in the rotor 11 approximately intermediate the ends thereof. The outer side of the drum head 13 is a circular enlargement 29 provided with shoulders 30 and 31, the object of which will presently appear.

The outer side of the end wall 2, adjacent to the upper edge thereof, is provided with a longitudinally apertured boss 32 and journaled in said boss is a rock shaft 33. This rock shaft is adapted to be rocked by a rock head, operated by a cable, engine or any other suitable mechanism, especially the starting and stopping mechanism of an elevator. For this reason I have not illustrated the mechanism employed for rocking the shaft, for as before stated, the switch is applicable to various uses. Mounted upon the shaft 33 is a sector gear 34 and the inner side of this gear has an enlargement 35 provided with teeth 36. The sector gear 34 is adapted to mesh with a segment gear wheel 37 mounted upon the protruding end of the rotor 11. The segment gear 37 forms the end of a hub 38 that has a tooth 39 adapted to be engaged by the teeth 36 and the inner end of the hub has a cam 40.

Pivotally connected to the inner side of the end wall 2 by pins 41 are oppositely disposed arms 42 and 43 having the upper ends thereof apertured, as at 44 and connected by retractile springs 45 to the end wall 2. The lower ends of the arms 42 and 43 are adapted to engage the shoulders 30 and 31 respectively of the circular enlargement 29 of the drum head 13. The sides of the arms 42 and 43, at the lower ends thereof, are provided with spindles 46, protruding through oblong openings 47 provided therefor in the end wall 2. The outer ends of the spindles 46 are provided with revoluble rollers 48 retained normally in engagement with the cam 40, as best shown in Fig. 3 of the drawings.

Pivotally connected to the inner side of the end wall 2 by a pin 49 is a lever 50 having the long arm thereof connected to the wall 2 by a coiled retractile spring 51. The short arm of the lever 50 has a spindle 52 extending through an opening 53 provided therefor in the wall 2. The outer end of the spindle 52 has a revoluble roller 54 normally engaging the cam 40. The short arm of the lever 50 also has a tooth 55 adapted to alternately engage the shoulders 30 and 31 of the enlargement 29 of the drum head 13.

Operation: In order that the operation of the switch can be fully understood, it is necessary to bear in mind that the coiled spring 26 encircling the rotor 11 is normally inactive, that is, it is not under tension except when the switch is operated. I will now assume that the shaft 33 is rocked. The movement of the shaft 33 is free until one of the teeth 36 engages the tooth 39 and then the teeth of the sector gear 34 mesh with the teeth of the segment gear 37. The spring 26 assumes tension as the segment gear 37 revolves, until the lever 43 is released. The tension of the spring 26 quickly restores the drum head 13 so that the shoulder 30 engages the tooth 55 of the lever 50. The spring in this position is not under tension. The short arm of the lever 50 is not released until the cam 40 has been sufficiently moved, and immediately upon the rock shaft 33 being rocked in the opposite direction, the sector gear 34 moves the segment gear and consequently the cam thereof, placing the spring 26 under tension in the opposite direction, releasing the arm 50 and allowing the spring to quickly restore the parts to a central position. A rocking movement of the shaft 33 in the opposite direction actuates the contact drum in the same manner, only in an opposite direction, and it is through the medium of the spring 26 that a quick make and break contact is accomplished between the contact pieces of the drum and the contact fingers, thereby preventing the motor from being burned out.

From the foregoing it will be observed that the sector gear 34 and the segment gear 37 constitute means for revolving the rotor 11 and placing the spring 26 under tension, while the arms 42 and 43, together with the lever 50, constitute means for holding the drum 14 in an adjusted position until released. The contact drum describes an oscillatory movement and the spring inclosed by said drum is of sufficient strength to produce a sharp and precise movement of the drum when released.

It is thought that the operation and utility of the switch will be apparent without further description, and while in the drawings there is illustrated a preferred embodiment of the invention, it is to be understood that the structural elements thereof are susceptible to such variations as fall within the scope of the appended claims.

What I claim is:—

1. In a switch for alternating current machines for elevator service, the combination with a rock shaft, of a rotor means operated by said rock shaft and capable of operatively engaging with said rotor for oscillating it, a contact drum loosely mounted upon said rotor and having a yieldable connection with said rotor, means for holding said drum during a movement of said rotor in one direction, and means adapted to release the first mentioned means whereby said drum will oscillate relatively to said rotor, and sets of contact fingers associated with said drum.

2. In a switch for alternating current machines, an oscillatory rotor, a contact drum loosely mounted upon said rotor and yieldably connected thereto, means for holding said drum during a movement of said rotor, and means for releasing said drum whereby said drum will oscillate while said rotor is stationary.

3. In a switch for alternating current machines, a rotor, a contact drum loosely mounted upon said rotor, a spring encircling said rotor within said drum and having one end thereof fixed to said rotor and the opposite end to said drum, means in connection with said rotor for placing said spring under tension, means for automatically holding said drum during the operation of said rotor, and means adapted to release the last mentioned means whereby said spring can restore said drum to its normal position.

4. In a switch for alternating current machines for elevator service, the combination with a rock shaft, of a rotor, a contact drum loosely mounted upon said rotor, a spring connecting said rotor and said drum, means actuated by said rock shaft and operatively engaging with said rotor for placing said spring under tension, means for holding said drum while said spring is placed under tension, and means operated by said rotor for automatically releasing the last mentioned means.

5. In a switch for alternating current machines for elevator service, a rotor, a contact drum loosely mounted upon said rotor, sets of contact fingers associated with said drum, a spring having the ends thereof attached to said rotor and to said drum, means including gears for placing said spring under tension, means including arms for holding said drum while said spring is placed under tension, means including a lever for locking said drum in an adjusted position, and means carried by said rotor for releasing said arms and lever.

6. In a switch for alternating current machines for elevator service, the combination with contact fingers and a contact drum adapted to make and break circuits through said fingers, of a spring located within said drum, a rotor including sector gears for placing said spring under tension, means including arms for holding said drum while said spring is placed under tension, means for automatically locking said drum in an adjusted position, and means carried by said rotor for releasing said arms and locking means.

7. In a switch for alternating current machines for elevator service comprising the combination with sets of contact fingers, oppositely disposed bars for connecting a finger to one set of a finger of another set and an oscillatory contact drum for making and breaking circuits through said fingers of a spring located within said drum, a rotor including sector gears for placing said spring under tension, means capable of engaging with said gears for operating them, a pair of elements engaged with said drum for holding the same stationary while said spring is placed under tension, means for automatically locking said drum in an adjustable position and means carried by the rotor for releasing said arms and said locking means.

8. In a switch of alternating current machines for elevator service the combination of contact fingers, and an oscillatory contact drum for making and breaking circuits through said fingers of a spring located within said drum and capable of oscillating the latter, a rotor including sector gears for placing said spring under tension, spring controlled pivoted arms adapted to engage said drum for holding it while said spring is placed under tension, said arms provided with rollers, a spring controlled lever adapted to engage said drum for locking it in an adjusted position, a roller carried by said lever and a cam carried by said rotor, and adapted to engage said rollers to release the arms and lever.

9. In a switch for alternating current means for elevator, a rotor and an oscillating contact drum loosely mounted upon said rotor, means for yieldably connecting said drum to said rotor, said means constituting a medium for oscillating said drum, contact fingers associated with said drum, means for holding said drum during a movement of said rotor, means carried by the rotor for releasing said holding means whereby said drum will be oscillated by its operative means while said rotor is stationary, and means for operating said rotor.

10. In a switch for alternating current means for elevator, a rotor, an oscillating contact drum loosely mounted upon said rotor, means for yieldably connecting said drum to said rotor, said means constituting a medium for oscillating said drum, contact fingers associated with said drum, means for holding said drum during a movement of said rotor, means carried by the rotor for releasing said holding means whereby said drum will be oscillated by its operative means while said rotor is stationary, and means for operating said rotor, and means for locking said drum in its adjustable position, said locking means capable of being released by the means carried by the rotor for releasing said holding means.

In testimony whereof I affix my signature in the presence of two witnesses.

FREDRICK WILLIAM TREFRY.

Witnesses:
KARL H. BUTLER,
MAX H. SROLOVITZ.

---

Copies of this patent may be obtained for five cents each, by addressing the "Commissioner of Patents, Washington, D. C."